United States Patent
Soellaart-Roelofsen et al.

[11] Patent Number: 5,814,395
[45] Date of Patent: Sep. 29, 1998

[54] METAL-POLYPROPYLENE-METAL LAMINATE AND METHOD OF MAKING A SHAPED SHEET ARTICLE OF SUCH A LAMINATE

[75] Inventors: Maria E. Soellaart-Roelofsen, Oostzaan; Jan Bottema, Santpoort-Zuid, both of Netherlands

[73] Assignee: Hoogovens Hylite BV, Ijmuiden, Netherlands

[21] Appl. No.: 497,701

[22] Filed: Jun. 30, 1995

Related U.S. Application Data

[63] Continuation of Ser. No. 145,109, Nov. 3, 1993, abandoned.

[30] Foreign Application Priority Data

Nov. 11, 1992 [NL] Netherlands ............................ 9201968

[51] Int. Cl.$^6$ ...................................................... B32B 7/02
[52] U.S. Cl. ......................... 428/213; 428/214; 428/215; 428/414; 428/416; 428/460; 428/461; 428/332; 428/334
[58] Field of Search ................................. 428/461, 460, 428/414, 416, 332, 334, 212, 213, 214, 215

[56] References Cited

U.S. PATENT DOCUMENTS

| | | | |
|---|---|---|---|
| 4,313,996 | 2/1982 | Newman et al. | 428/215 |
| 4,394,485 | 7/1983 | Adur | 525/74 |
| 4,403,010 | 9/1983 | Festag et al. | 428/200 |
| 4,521,265 | 6/1985 | Kunihiko et al. | 156/229 |
| 4,671,985 | 6/1987 | Rodrigues et al. | 428/215 |
| 5,132,172 | 7/1992 | Simpson et al. | 428/336 |

FOREIGN PATENT DOCUMENTS

| | | |
|---|---|---|
| 0019835 | 12/1980 | European Pat. Off. . |
| 0046444 | 2/1982 | European Pat. Off. . |
| 0078174 | 5/1983 | European Pat. Off. . |
| 0115103 | 8/1984 | European Pat. Off. . |
| 0184549 | 6/1986 | European Pat. Off. . |
| 0479369 | 4/1992 | European Pat. Off. . |
| 1186236 | 4/1970 | United Kingdom . |

OTHER PUBLICATIONS

MPD (Materials Property Data) Network Asmdata?Manufacturer's and Handbook Data AN: 140–15595 1993.
J, Brandrup, F.H. Immergut "Polymer Handbook" 1989, John Wiley & Sons, Toronto, BLDZ.: Ref. V/30/31.
C.A. Daniels "Polymers: Structure and Properties", 1989, Technomic Publishing Co., Inc., Lancaster, Bldz.: 44–45, 81.
G. Challa "Polymeer Chemie", 1973, Het Spectrum B.V., Bldz.: 132–33 Transaction Of This Document Attached.
Handbook of Adhesives, 1977, pp. 8, 9, 533, 655–659.

*Primary Examiner*—Stevan A. Resan
*Attorney, Agent, or Firm*—Watson Cole Stevens Davis, P.L.L.C.

[57] ABSTRACT

A metal-polypropylene-metal laminate, in which the metal sheets are steel or aluminum is provided which is suitable for cold-forming followed by heat treatment at at least 135° C., e.g. for use in vehicle bodywork. To achieve this, the polypropylene of the core of the laminate has a yield stress at the heat treatment temperature of not less than 2 MPa, and has shape stability such that in a standard shape stability test at the heat treatment temperature it changes shape by not more than 0.5°. A bonding agent between the polypropylene core and the metal sheets is suitably one having a thermosetting component and a polypropylene thermoplastic component.

15 Claims, 3 Drawing Sheets

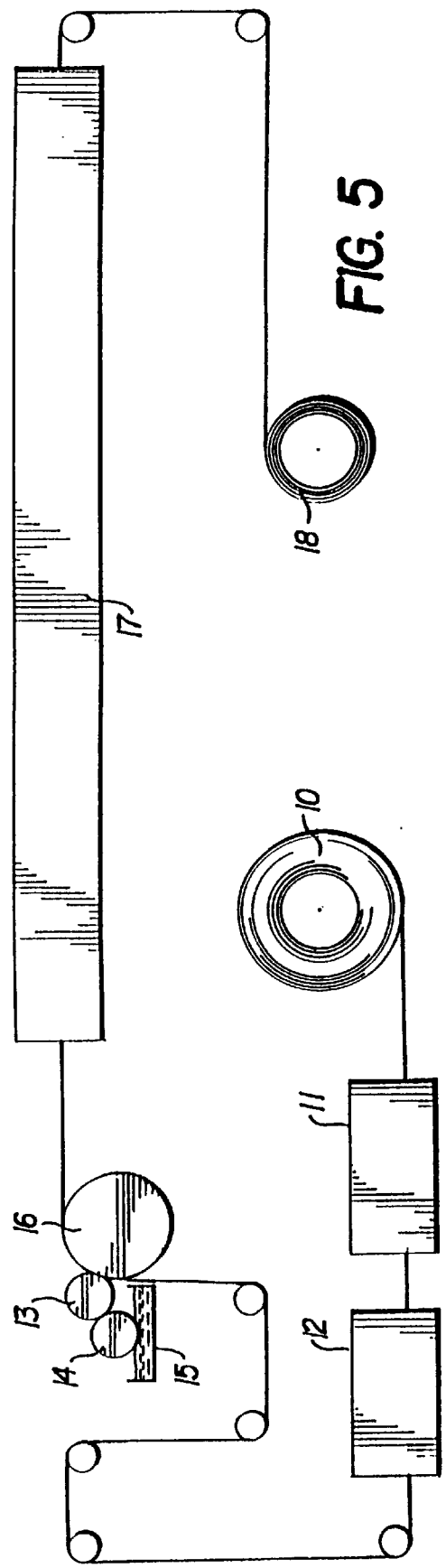
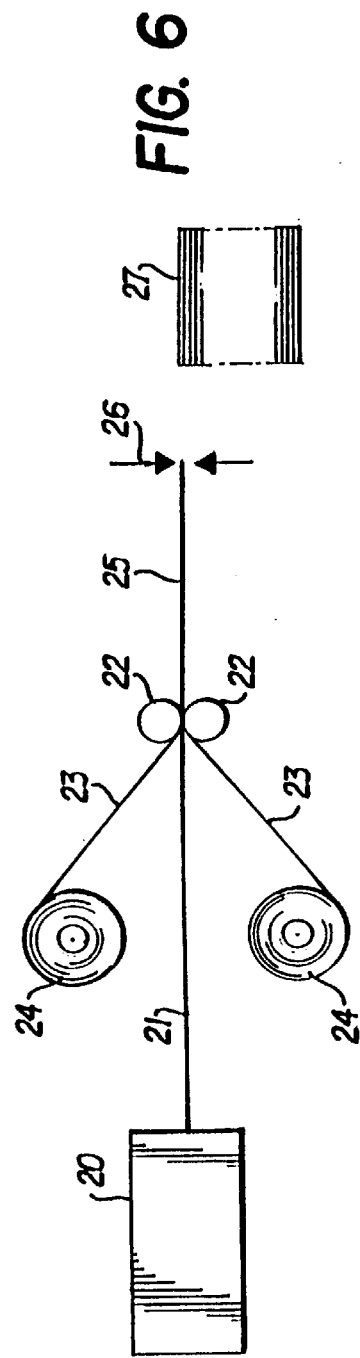
FIG. 5
FIG. 6

METAL-POLYPROPYLENE-METAL LAMINATE AND METHOD OF MAKING A SHAPED SHEET ARTICLE OF SUCH A LAMINATE

This application is a Continuation of application Ser. No. 08/145,109, filed Nov. 3, 1993 now abandoned.

BACKGROUND OF THE INVENTION

1. Field of the Invention

This invention relates to metal-polypropylene-metal laminates and to methods of making shaped sheet articles of such laminates. The metal sheets of the laminates are aluminium or steel. The laminates are applicable to such shaped sheet articles as vehicle bodywork parts, particularly parts which are subjected to heat-treatment at relatively high temperature after shaping of the laminate.

2. Description of the Prior Art

The background of the invention will be described in relation to aluminium-polypropylene-aluminium laminates, but the discussion is generally applicable to steel-polypropylene-steel laminates as well.

For many years attempts have been made to replace the steel sheet conventionally used for car bodywork parts by lighter laminates. Various different combinations of plastics and metal materials have been proposed. Reference may be made to 1) Modern Plastics International, April 1980, pages 58–60, A. Stuart Wood, which describes steel/polypropylene laminates, 2) SAE Technical Paper Series No. 800077 (1980), William K. Miller, which is a general review, and (3) SAE Technical Paper Series No. 800078 (1980), J. A. DiCello, which also describes steel-polypropylene laminates.

An aluminium/polypropylene laminate is described in NL-A-9102127.

A stringent requirement for an aluminium-polypropylene-aluminium laminate for bodywork applications is that a shaped bodywork component manufactured from it should remain stable of shape at the painting temperature of the component. The painting treatment of car bodies and bodywork components made of steel consists of cataphoresis, filler and top-coat processes. The cataphoresis treatment step usually takes place at approximately 180° C. However, in the case of aluminium this treatment step may be omitted. For the two remaining treatments the filler treatment usually takes place at a temperature that is equal to or somewhat higher than the temperature in the top-coat process. The filler treatment usually takes place at a temperature of at least 135° C. and mostly lies in the range 140° C. to 155° C. Within the framework of this patent application, the critical painting temperature must be understood to be the highest temperature to be attained in the painting treatment by the shaped article made from the laminate. The stringent requirement named above implies that following painting the bodywork may not display any, or hardly any, visible permanent alterations in shape. Such alterations in shape lead to the appearance of the bodywork not being sheer (e.g. free from surface wrinkles) and as such not acceptable to car buyers.

In practice in the present state of the art this stringent requirement may only be fulfilled by hot forming of the laminate, as is described for example in EP-A-547664. However, car factory press lines are adapted to cold forming and not directly suitable for hot forming and can only be made suitable for this with great difficulty. Moreover, hot forming requires extra energy consumption.

Other prior art documents to be noted are as follows.

EP-A-78174 describes metal-plastics-metal laminates, and proposes that strong adhesion of the plastics to the metal is obtained by pre-coating of the core on both sides with a modified resin capable of adhering strongly to the metal. Although resistance to ageing of the laminate at 100° C. is mentioned, and shaping of the laminate is also described, no attention is paid to the requirements for shape stability of a cold-formed laminate containing PP at 135° C. or higher. The use of relatively low melting modified resins as adhesives is likely to lead to lack of shape stability at high temperatures.

EP-A-184549 discusses aluminium-polypropylene-aluminium laminates suitable for forming. Shape stability at high temperature of the formed product is not discussed. To overcome strength problems in the thin aluminium sheets, it is proposed to use specific aluminium-containing alloys.

U.S. Pat. No. 4,521,265 describes a process of forming curves in a metal/plastics laminate, prior to cooling of the laminate in its manufacture, in order to avoid the formation of creases or waves. Problems of lack of shape stability of articles formed from such laminates are not discussed.

SUMMARY OF THE INVENTION

In view of the above problems, the object of the invention is to provide a laminate that is suitable for cold forming and has high shape stability in a subsequent heat treatment.

A further object of the invention is to provide a method of making a shaped sheet article of such a laminate, in which a cold-forming step is followed by a heat-treatment step and in which the shaped laminate has shape stability at high temperature in the heat-treatment step.

According to the invention in one aspect, there is provided a metal-polypropylene-metal laminate, suitable for cold-forming followed by treatment at a temperature of at least 135° C., comprising (a) two metal sheets made of metal selected from aluminium and steel and each having a thickness in the range 0.08 to 0.3 mm;

(b) a polypropylene core sandwiched between the metal sheets and having a thickness in the range 0.5 to 2 mm, the core being made of a polypropylene having at 135° C. a yield stress of not less than 2 MPa; and (c) a bonding agent effecting adhesion of the core to the metal sheets on each side;

(d) the laminate having shape stability such that it changes shape by not more than 0.5° in a shape stability test as herein defined carried out at 135° C.

By suitable selection of polypropylene of the core material and bonding agent, it is possible to obtain a laminate having shape stability such that it changes shape by not more than 0.5° in a shape stability test as herein defined at 140° C., or even 145° C.

The yield stress of the polypropylene at the relevant temperature is not less than 2 MPa preferably not less than 4 MPa.

The standard shape stability test applied to the laminates of the invention is defined and described below with reference to FIG. 2. This test, although it employs curvature in one plane only, has been found particularly useful for assessment of the behaviour of the laminates in practical applications involving curvature in two planes.

It must be emphasised that the present inventors have found that it is the combination of features of the laminate of the invention which leads to success in practical applications. Each feature taken on its own may not be sufficient to provide such success.

Hitherto, it has not been found possible to design a laminate having a polypropylene core which showed sufficiently shape stability when cold-formed and then subjected to a temperature even as high as 130° C. For reasons given above relating to painting temperatures of the laminates, shape stability at higher temperatures such as 135° C., 140° C. and even 145° C. is required, and can be provided by the invention.

Although attention has been paid in the past to ability of a shaped laminate to withstand temperatures arising in use in a car body, e.g. due to solar heating, there has not been analysis of the requirements for shape stability in a process of cold-forming followed by heat-treatment at a temperature such as 135° C. Particularly, the present inventors have now found that a yield stress of at least 2 MPa at the heat-treatment temperature is required for the polypropylene, in order that it can prevent shape deformation due to residual stress arising in the cold-forming step, and that furthermore the shape change in the standard shape stability test must be not more than 0.5°, preferably in the range +0.5° to −0.2°. Alternatively, or additionally, a high bond strength of the polypropylene core to the metal sheet should be achieved, and this can be particularly done by choice of the bonding primer of the type specified.

Without wishing to be limited or bound by theory, the applicants believe that hitherto attention has not been paid to what characteristics are required in a cold-formed metal-polypropylene-metal laminate, to prevent or reduce shape change on heat-treatment at temperatures approaching the melting point of polypropylene. It appears that an important factor is the ratio of the yield stress of the polypropylene at the heat-treatment temperature to the yield stress thereof at the cold-forming temperature. This may be because of the residual stress in the polypropylene, introduced in the cold forming step, which stress restrains movement of the metal sheets. To prevent loss of this residual stress, the polypropylene must have sufficient strength at the heat-treatment temperature, and also to prevent shape change in the heat-treatment the bonding of the polypropylene to the metal must be sufficiently strong. Based on the results of their studies, the inventors have found that the conditions specified by the invention in its different aspects provide the desired results. This approach is not to be found in the published prior art, where different considerations seem to have applied, as discussed above.

The polypropylene selected for the core, having a high yield stress at the heat-treatment temperature, is typically one having a high E-modulus at the heat-treatment temperature. The E-modulus of such a material is a property known to experts. High crystallinity and high purity, e.g. a homopolymer, may be desirable, but some polypropylene not fitting this description are also believed to be capable of use in the invention.

In the case where the metal of the laminate is aluminium, the metal sheets preferably have a thickness in the range 0.15 to 0.3 mm and the polypropylene core has a thickness in the range 0.6 to 2 mm.

Particularly it is preferred that the bonding agent is a bonding primer comprising a thermosetting resin component and a thermoplastic resin component. This has been found to give especially strong bonding, so that adhesion is not lost even at the high heat-treatment temperature of the laminate (135° C. or above). For this purpose preferably the thermoplastic resin component of the bonding primer is a polypropylene having a melting point not lower than the melting point of the polypropylene of the core.

The most preferred bonding primer is one which forms two layers consisting of a first layer primarily of the thermosetting resin component adhered to said metal sheet and a second layer primarily of the thermoplastic resin component adhered to said polypropylene core.

Bonding primers of this type for a laminate are only known for a metal-plastic laminate for packaging purposes. For example, from GB-A-b 2,123,746 the use is known of a bonding primer in the case of metal-polyester laminate for drinks cans. However, no demands are made on shape stability for this laminate. Also bonding foil, also referred to as bonding film, is used for vehicle bodywork applications in the case of the manufacture of an aluminium-plastic-aluminium laminate. For example, EP-A-184 549 describes such use of polypropylene bonding foil. The applicants have found that, following cold forming, such a laminate is not stable of shape at high temperature. The reason for this is still the subject of study, but it is believed that it may be related to the fact that in the case of the conventional polypropylene bonding foils, a low molecular weight is generally used which deteriorates the high temperature characteristics.

As mentioned, preferably the bonding primer is a blend of thermoplastic and a thermo-setting components and more preferably the thermoplastic component a polypropylene and the thermo-setting component is an epoxy resin. Applying a thermo-setting component in the bonding primer has the advantage that following curing a particularly good bond is achieved with the metal cover sheets. Following softening and melting with the core, in the lamination step, the polypropylene in the bonding primer achieves a very good bond with the core because the thermoplastic in the bonding primer is compatible with the core.

The thickness of this bonding primer is preferably in the range 2 to 20 μm, more preferably 5 to 15 μm, to obtain the greatest adhesion.

Although the combined thermosetting and thermoplastic bonding primer discussed above is preferred in the practice of the invention, other adhesives may be used if they contribute to giving the laminate the characteristics required by the invention as set out above. In particular, the adhesion at the relevant temperature (135° C. or even higher) must be sufficient. For example, a bonding agent containing a polypropylene of relatively high melting point and adapted to adhere strongly to the metal layer, may be useful in the invention, even though it does not contain a thermosetting component.

In another aspect, the invention provides a metal-polypropylene-metal laminate, suitable for cold-forming followed by treatment at a temperature of at least 135° C., comprising (a) two metal sheets made of metal selected from aluminium and steel and each having a thickness in the range 0.08 to 0.3 mm;

(b) a polypropylene core sandwiched between the metal sheets and having a thickness in the range 0.5 to 2 mm, the core being made of a polypropylene having at 135° C. a yield stress of not less than 2 MPa; and (c) a bonding agent effecting adhesion of the core to the metal sheets on each side;

said bonding agent being a bonding primer comprising a thermosetting resin component cured in situ on the respective metal sheet and a thermoplastic resin component.

The invention further provides a shaped sheet article made of sheet which has curvature in two planes, wherein the sheet is a metal-polypropylene-metal laminate according to the invention as described above, which has been shaped by cold-forming.

In its first method aspect, the invention provides a method of making a shaped sheet article, comprising the steps of
(a) providing a sheet of metal-polypropylene-metal laminate comprising
(i) two metal sheets made of metal selected from aluminium and steel and each having a thickness in the range 0.08 to 0.3 mm;
(ii) a polypropylene core sandwiched between the metal sheets and having a thickness in the range 0.5 to 2 mm; and
(iii) a bonding agent effecting adhesion of the core to the metal sheets on each side;
(b) cold-forming the laminate so as to give it the desired shape of the shaped sheet article, which shape has curvature in two planes;
(c) after step (b), subjecting the cold-formed laminate to a further processing step including heating at a heat-treatment temperature which is not less than 135° C.; wherein the polypropylene of the core has a yield stress of not less than 2 MPa at said heat-treatment temperature and the laminate has shape stability such that it changes shape by not more than 0.5° in a shape stability test as herein defined carried out at said heat-treatment temperature.

The heat-treatment in this method may be not less than 140° C., or even not less than 145° C.

This method of the invention has been particularly successful when it includes forming the laminate by a process including the steps of
(A) applying the bonding agent to the metal sheets, the bonding agent being a bonding primer comprising a thermosetting resin component and a thermoplastic resin component.
(B) curing the thermosetting resin component of the bonding agent in situ on the metal sheets; and
(C) after step (B), laminating the metal sheets to the polypropylene core by heating an assembly of the metal sheets and the polypropylene core at a temperature sufficient at least partly to soften the polypropylene.

Preferably, to achieve good adhesion, the step (B) of curing said thermosetting resin component takes place in the temperature range 180° to 250° C., more preferably 200° to 230° C.

Preferably in the step (C) at least the metal sheets are heated to a temperature in the range 180° to 250° C., more preferably 210° to 250° C.

For convenience of production, the steps (A) and (B) may be performed on the metal sheet which is in strip form and is being uncoiled and, after said steps (A) and (B) is recoiled.

In its second method aspect, the invention provides a method of making a shaped sheet article, comprising the steps of
(a) applying bonding agent to metal sheet material made of metal selected from aluminium and steel and having a thickness in the range of 0.08 to 0.3 mm, the bonding agent being a bonding primer comprising a thermosetting resin component and a thermoplastic resin component;
(b) curing the thermosetting resin component of the bonding agent in situ on the metal material;
(c) after step (b), laminating two metal sheets made of the metal sheet material to a polypropylene core of thickness in the range 0.5 to 2 mm so as to form a laminate having the core sandwiched between the metal sheets and adhered thereto by the bonding agent, by heating an assembly of the metal sheets and the polypropylene core at a temperature sufficient at least partly to soften the polypropylene;
(d) cold-forming the laminate so as to give it the desired shape of the shaped sheet article, which shape has curvature in two planes;
(e) after step (d), subjecting the cold-formed laminate to a further processing step including heating at a heat-treatment temperature which is not less than 135° C.; wherein the polypropylene of the core has a yield stress of not less than 2 MPa at said heat-treatment temperature.

The applicants believe that it is important to consider the ratio of the yield stress of the polypropylene of the core at the heat-treatment temperature and the cold-forming temperatures. The yield stress at cold-forming temperatures is related to the stress introduced in the cold-forming, while the yield stress at the heat-treatment temperature determines the resistance to release of that stress.

Accordingly, in another aspect, the invention provides a method in which a metal-polypropylene-metal laminate is cold-formed into a shaped article having curvature in two planes and subsequently subjected to a heat treatment. In order that the shaped article has shape stability when the heat treatment is carried out at at least 135° C., the polypropylene of the laminate is selected to have a yield stress of at least 2 MPa at the heat treatment and to have a ratio of yield stress at the heat treatment temperature to its yield stress at the temperature of the cold forming such that residual stress present in the polypropylene as a result of the cold-forming is not dissipated significantly in said heat treatment.

Preferably the yield stress of the polypropylene at the heat-treatment temperature is in the range of 5 to 15%, more preferably 8 to 15%, most preferably 10 to 15%, of the yield stress thereof at the temperature of the cold-forming.

Preferably aluminium used as the metal of the laminate is selected from Aluminium Association series types AA5xxx and AA6xxx. This enables an acceptable denting resistance to be achieved. Preferably the AA5182 or AA5754 variety in supply state 0 is selected, that is to say in soft annealed state. These varieties are easily obtainable as thin strip. It is to be recommended that the aluminium be prestretched before lamination in order to prevent so-called Lüders lines when the laminate is being cold formed.

BRIEF INTRODUCTION OF THE DRAWINGS

The invention will now be explained further and illustrated in more detail, with reference to the accompanying drawings showing non-limitative embodiments. In the drawings;

FIG. 5 is a diagram of a coil coating apparatus and method, used to apply bonding agent to aluminium strip in a process of the invention;

FIG. 6 is a diagram of a laminating apparatus and method, in a process of the invention.

DESCRIPTION OF PREFERRED EMBODIMENTS

Figure 1:
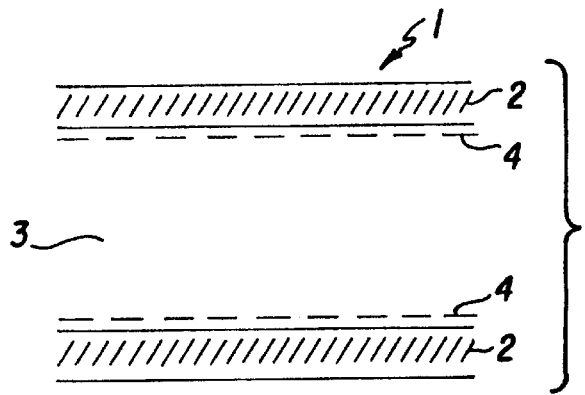
FIG. 1 is a schematic sectional view of a laminate embodying the invention.

FIG. 1 shows an aluminium-polypropylene-aluminium laminate 1 in accordance with the invention consisting of two skin sheets 2 of aluminium with a thickness in the range 0.15–0.3 mm, a core 3 of solid polypropylene with a thickness in the range of 0.6–2 mm and a layer of bonding primer 4 between the core 3 and each of the skin sheets 2 with a thickness of typically 10 μm uniting the core 3 and the sheets 2 into a strongly bonded laminate. The laminate is shown in flat form, prior to shaping of an article from it. The laminate is typically supplied to a shaping press line in the form of flat rectangular blanks, of standard size.

Figure 2:
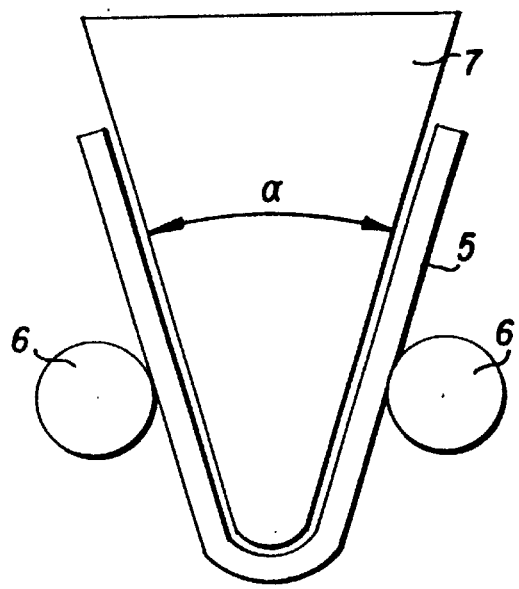
FIG. 2 is a diagram illustrating the standard shape stability test employed in the present invention.

In order to ascertain the stability of shape of a metal-polypropylene-metal laminate, a test piece 5 is tested in the standard shape stability test, with the aid of the apparatus shown in FIG. 2. The test piece 5 of laminate of size 90 mm by 150 mm is first cold-formed (bent) to apply single curvature (curvature in one plane only) using bending cylinders 6 with a diameter of 25 mm and a centre-to-centre distance of 48 mm and a mandrel 7 with an apex angle a of 60° and at its apex a smooth curvature of fillet radius of 6 mm. On removal of the mandrel 7 the bent laminate springs back, e.g. by an angle of 5°. The permanent bend is therefore less than 60°. Next the bend angle of the bent test piece thus formed is measured and the test piece is then placed in a furnace with a temperature equal to the desired test temperature, in order in this manner to simulate a temperature loading of the shaped laminate. After remaining for approximately 30 minutes in the furnace, a period which is considered to be representative for the filler and top-coat treatments in a painting line, the test piece is allowed to cool and the bend angle is measured again. The difference of the bend angle before and after the furnace treatment is called the angle of residual resilience ψ. The angle ψ of residual resilience of the test piece is a measure of the thermal shape stability of a component manufactured from the laminate under test. A small residual resilience angle ψ means a high thermal shape stability. This standard shape stability test is the test referred to in the present claims.

In order further to ascertain the stability of shape of the laminate, in a second test a test piece of laminate of size 300 mm by 500 mm is deep-drawn in cold condition into a 28 mm deep rectangular tray shape 8 (see FIG. 3) with a slightly curved base. In this test the shaped article is subjected to the same temperature cycle as the test piece in the shape stability test of FIG. 2. Before and after the temperature cycle a number of contours of the tray shape are accurately recorded by means of a contourograph so that any alterations in shape can be determined. At the same time the tray is visually assessed for alterations in shape and appearance. The results of this test are given qualitatively.

Figure 3:
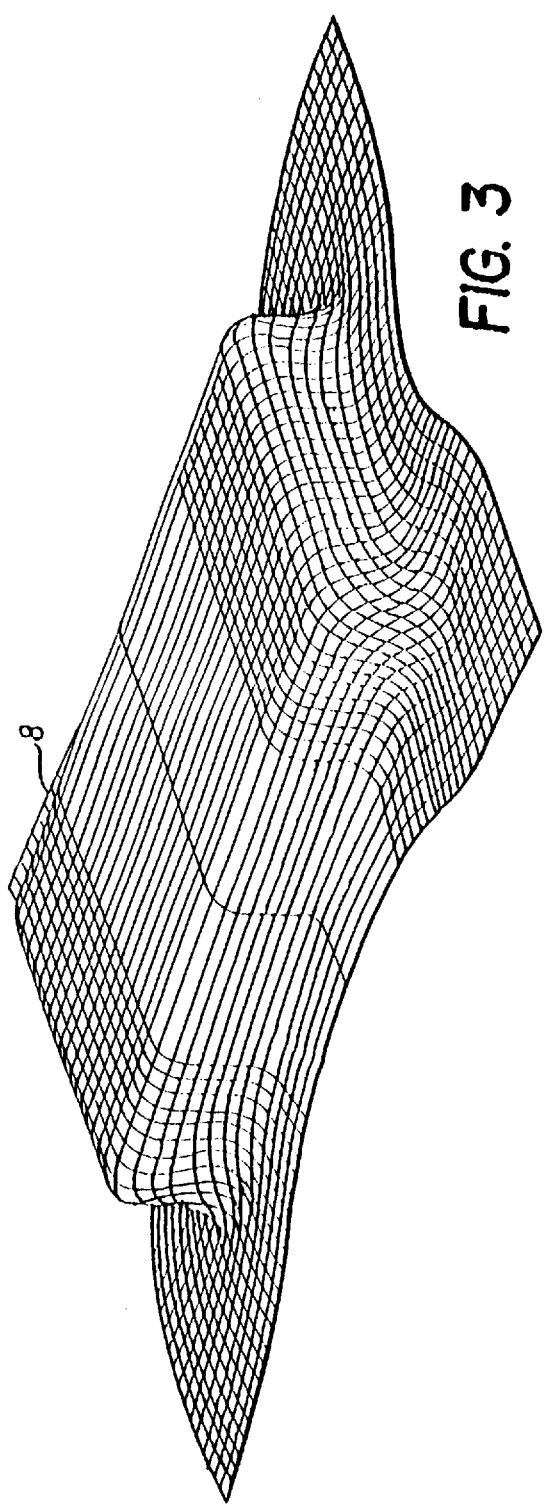
FIG. 3 is a diagram illustrating the shape of a shaped article having a tray shape with curvature in two planes (double curvature), also used as a test in the embodiments described below.

Table 1 gives the results of the shape stability test of FIG. 2 and the tray test of FIG. 3, which were carried out in order to determine the stability of shape of several different laminates at two different heat-treatment temperatures.

TABLE 1

| | Test | | | | |
|---|---|---|---|---|---|
| | I | II | III | IV | V |
| Laminate | A | B | C | C | D |
| Al skin sheet type | AA 5182-0 | AA 5182-0 | AA 5182-0 | AA 5182-0 | AA 5182-0 |
| Al skin sheet thickness | 0.2 mm | 0.2 mm | 0.2 mm | 0.2 mm | 0.2 mm |
| Core | PP A | PP A | PP C | PP C | PP D |
| Core thickness | 0.8 mm | 0.8 mm | 0.8 mm | 0.8 mm | 0.8 mm |
| Yield stress of PP at test temperature | 5 MPa | 5 MPa | ~2 MPa | 4 MPa | <2 MPa |
| Bonding agent | primer | foil | primer | primer | primer |
| Laminate thickness | 1.2 mm | 1.2 mm | 1.2 mm | 1.2 mm | 1.2 mm |
| Test temperature | 145° C. | 145° C. | 145° C. | 140° C. | 145° C. |
| Shape stability-shape change | 0.18° | −2.8° | 0.8° | 0.04° | Large |
| Tray test | minimal shape alteration; sheer product | great shape alteration; product not sheer | great shape alteration; product not sheer | No data | very large shape change |

PP A is a polymer sold with the designation ELTEX HCS 580 by Solvay S.A. (Belgium). The manufacturers state that its yield stress at 23° C., 50 mm/min, measured according to ISO R527 is 40 MPa, and that its melting point is 165° C. and density 915 kg/m³. In the present applicants' measurements, its yield stress is as follows:

| Temperature (°C.) | Yield stress (MPa) |
|---|---|
| 21 | 43 |
| 140 | 6 |
| 145 | 5 |

PP C is a polypropylene sold with the designation ELTEX HL 411 by Solvay S.A. (Belgium). The manufacturers state that its yield stress at 23° C., 50 mm/min, measured according to ISO R527 is 35 MPa, and that its melting point is 159° C. and density 907 kg/m³. In the present applicants' measurements, its yield stress is as follows:

| Temperature (°C.) | Yield stress (MPa) |
|---|---|
| 21 | 33 |
| 140 | 4 |
| 145 | ~2 |

PP D is a polypropylene product ELTEX KL 107 of Solvay S.A. of melting point 150° C.

The bonding primer used for laminates A, C and D is Mor-Ad M-800 polypropylene laminating adhesive of Morton Thiokol Inc. (USA), which consists of epoxy and polypropylene components. This is applied to the aluminium sheet in accordance with the manufacturers instructions, with a sheet temperature of 200° to 240° C. to effect bonding, to give a primer layer of about 10 μm in thickness. Typically, the peak temperature of the metal sheet is 240° C. This layer is illustrated by FIG. 5, described below. The melting point of the PP component is about 165° C.

In the case of laminate B, the bonding agent used is of foil type, and is 50 μm thick PP foil product no. 8013 of Solvay S.A. This is applied to the metal sheets at the same time as the PP core, to form the laminate with heating to effect bonding.

These test results show that the two laminates of the invention A and C have, for A at 145° C. and for C at 140°

C. but not at 145° C., good shape stability in the shape stability test. Such laminates therefore are useful in the manufacture of bodywork parts which are cold-formed and then subjected to painting temperatures as high as 145° C. (laminate A) and 140° C. (laminates A and C). Comparative Laminates B and D fail the shape stability test level of maximum shape change of 0.5 at 145° C.

Figure 4:
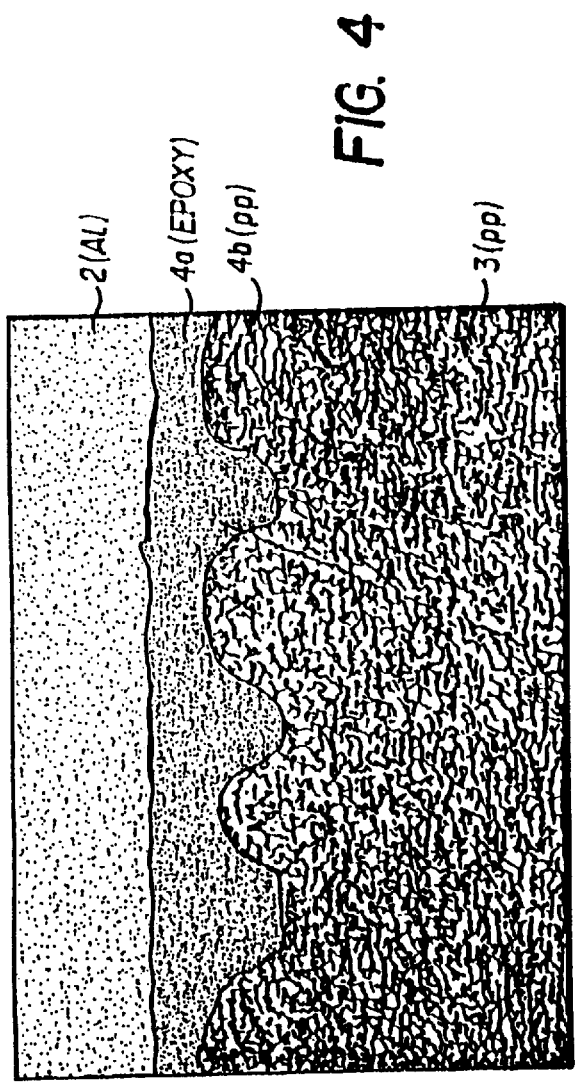
FIG. 4 is a schematic diagram of a scanning electron micrograph of a part of a section of a laminate embodying the invention, showing the double layer structure of the bonding agent employed.

FIG. 4 is an a schematic diagram of SEM showing the two-layer structure of the bonding primer of epoxy/PP two-component type used in laminates A,C and D. It can be seen how the primer forms a double layer structure with the epoxy resin forming a layer 4a on the aluminium sheet 2 and the PP of the primer forming a layer 4b intermixing with the PP of the core 3. The sinuous boundary of the layers 4a,4b provides excellent adhesion.

FIG. 5 shows a coil coating line, for pre-coating the Al strip with primer. The strip is uncoiled from coil 10 and passes through two preparation stages 11,12. A contact roller 13 and a transfer roller 14 transfer the primer from a tank 15 onto one surface of the strip, which is supported by backing roller 16. The strip then passes through an oven 17 which effects curing of the thermosetting epoxy component of the primer at 200° to 240° C. (peak metal temperature), before recoiling at 18. The coating step is easily and cheaply carried out on continuous metal strip, as shown, separately from the formation of the laminate.

FIG. 6 shows diagrammatically an uncoiler 20 which delivers a band 21 of cold polypropylene. At heated nip rollers 22 this band 21 is pressed against two primer-coated aluminium strips 23, uncoiling from coils 24. The strips 23 reach a temperature of about 235° C. The band 21 is thereby sufficiently heated to effect bonding to the primer on the aluminium strips, to achieve lamination. The laminate 25 is then divided at shears 26, and stacked at 27.

Figure 7:
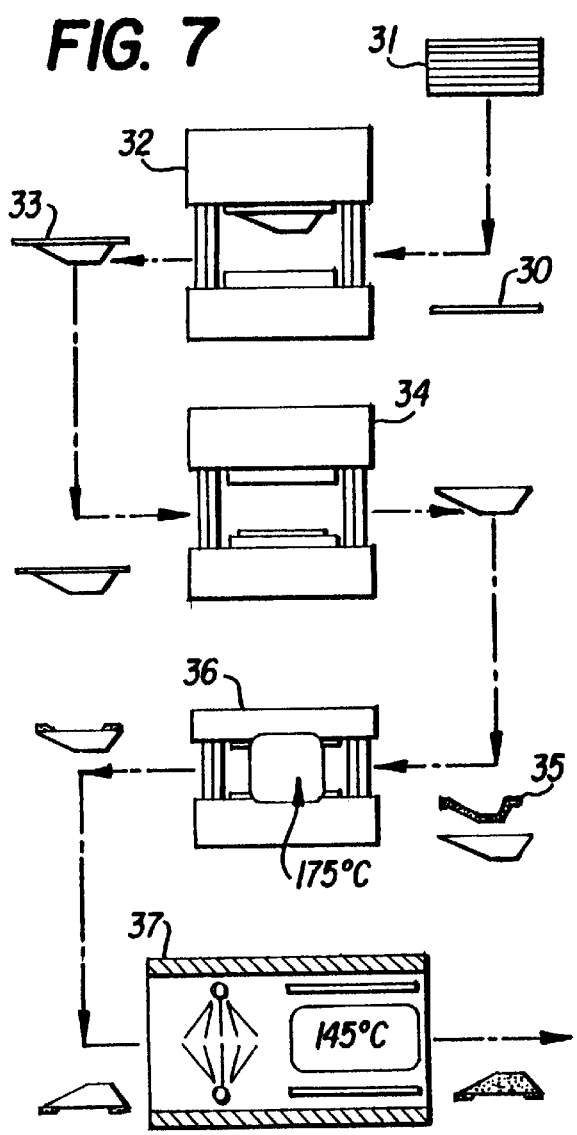
FIG. 7 is a diagram showing the steps of cold-forming and painting a bodywork part in a method of the invention.

FIG. 7 shows the typical manufacture of a car bodywork part in one embodiment of the invention. A suitable laminate blank 30, from a stack 31 is press-formed when cold at a press 32 to form a shaped article 33 with double curvature. This is then trimmed in a trimming cutter 34 to give a trimmed shaped article. This is attached to a further part 35 in a press 36, with localised heating at its edges to 175° C., which does not affect its shape. The laminate is then subjected to spray-painting followed by paint-curing for a prolonged period at 145° C. in painting apparatus 37, to provide the desired painted article. The laminate selected is one with polypropylene having yield strength of at least 2 MPa at 145° C. and having shape stability of less than 0.5° in the test of FIG. 2, at 145° C.

Although the invention has been illustrated by embodiments, it is not limited by those embodiments and includes all modifications and equivalents within the scope of the inventive concept as set out herein.

What is claimed is:

1. Metal-polypropylene-metal laminate, suitable for cold-forming followed by treatment at a temperature of at least 135° C., comprising
    (a) two metal sheets made from one of the metals selected from the group consisting of aluminum and steel and each metal sheet having a thickness in the range of from 0.08 to 0.3 mm;
    (b) a polypropylene core sandwiched between said metal sheets and having a thickness in the range of from 0.5 to 2 mm, said core being made of a polypropylene having at 135° C. a yield stress of not less than 2 MPa; and
    (c) a bonding primer effecting adhesion of said core to said metal sheets on each side;
    said bonding primer comprising an epoxy resin component and a polypropylene component, said epoxy resin component of the binding primer being cured on the metal sheets before the metal sheets are laminated to the polypropylene core and the components of the binding primer forming an interface comprising a sinuous interface between the metal sheets and the polypropylene core.

2. Metal-polypropylene-metal laminate according to claim 1 wherein said polypropylene component of said bonding primer is a polypropylene having a melting point not lower than the melting point of said polypropylene of said core.

3. Metal-polypropylene-metal according to claim 2 wherein said bonding primer forms two layers on each side of the polypropylene core upon application to the metal and cured, said bonding primer consisting of a first layer of said epoxy resin component adhered to said metal sheet and a second layer of said polypropylene component adhered to said core.

4. Metal-polypropylene-metal laminate according to claim 1 wherein said bonding, primer has a thickness in the range 2 to 20 $\mu$m.

5. Metal-polypropylene-metal laminate according to claim 1 wherein said bonding primer has a thickness in the range 5 to 15 $\mu$m.

6. A cold-formed shaped article, said article being in the form of a sheet which has a curvature in two non-parallel planes and comprised of a metal-polypropylene-metal laminate according to claim 1.

7. The metal-polypropylene-metal laminate according to claim 1, wherein said laminate has shape stability such that it changes cold shaping by no more than 0.5° at 135° C.

8. Metal-polypropylene-metal laminate according to claim 7 wherein said laminate has shape stability such that it changes cold shaping by no more than 0.5° at 140° C.

9. Metal-polypropylene-metal laminate according to claim 8 wherein said laminate has shape stability such that it changes cold shaping by no more than 0.5° at 145° C.

10. Metal-polypropylene-metal laminate according to claim 7 wherein said polypropylene has at 140° C. a yield stress of not less than 2 MPa.

11. Metal-polypropylene-metal laminate according to claim 7 wherein said polypropylene has at 145° C. a yield stress of not less than 2 MPa.

12. Metal-polypropylene-metal laminate according to claim 7 wherein said polypropylene has at 135° C. a yield stress of not less than 4 MPa.

13. Metal-polypropylene-metal laminate according to claim 7 wherein said polypropylene has at 140° C. a yield stress of not less than 4 MPa.

14. Metal-polypropylene-metal laminate according to claim 7 wherein said polypropylene has at 145° C. a yield stress of not less than 4 MPa.

15. Metal-polypropylene-metal laminate according to claim 7 wherein said metal is aluminium, said metal sheets have a thickness in the range 0.15 to 0.3 mm and said polypropylene core has a thickness in the range 0.6 to 2 mm.

* * * * *